United States Patent

Hsu

[11] Patent Number: 6,059,158
[45] Date of Patent: May 9, 2000

[54] SCORING BOARD MOUNTING ARRANGEMENT FOR A GOLF CART

[75] Inventor: Sen-Jung Hsu, Taipei Hsien, Taiwan

[73] Assignee: New I-SO Enterprise Co., Ltd., Taipei Hsien, Taiwan

[21] Appl. No.: 09/131,406

[22] Filed: Aug. 10, 1998

[51] Int. Cl.⁷ .................................................. B60R 9/00
[52] U.S. Cl. .......................... 224/274; 224/277; 224/918; 224/919; 280/DIG. 6; 280/47.24; 108/134; 108/50.16
[58] Field of Search .......................... 280/47.131, 47.17, 280/47.19, 47.24, 47.26, DIG. 5, DIG. 6; 224/274, 277, 918, 919; 206/315.9, 579; 108/42, 50.16, 50.11, 134

[56] References Cited

U.S. PATENT DOCUMENTS

| D. 176,627 | 1/1956 | Nash | D34/5 |
|---|---|---|---|
| 2,523,590 | 9/1950 | Potter et al. | 224/277 |
| 3,128,021 | 4/1964 | Habbena | 224/29 |
| 4,917,282 | 4/1990 | Hufford | 224/274 |
| 5,004,137 | 4/1991 | Wu | 224/274 |
| 5,086,960 | 2/1992 | Schweitzer | 224/277 |
| 5,435,474 | 7/1995 | Lin | 224/274 |
| 5,678,740 | 10/1997 | Wang | 224/274 |
| 5,848,742 | 12/1998 | Wang | 224/274 |

FOREIGN PATENT DOCUMENTS

| 688912 | 3/1953 | United Kingdom | 224/277 |

*Primary Examiner*—Brian L. Johnson
*Assistant Examiner*—Gerald Klebe
*Attorney, Agent, or Firm*—Bacon & Thomas, PLLC

[57] ABSTRACT

A scoring board mounting arrangement includes a mounting frame fixedly mounted on the main rod member of a golf cart, a scoring board covered with a hinged cover plate and having a front end pivoted to a front end of the mounting frame, a coupling member coupled between the scoring board and the mounting frame and moved between a first position where the scoring board is closely attached to the mounting frame, and a second position where the scoring board is lifted from the mounting frame and retained in a horizontal position, and retaining means provided at the mounting frame to hold the coupling member in the second position.

5 Claims, 5 Drawing Sheets

SCORING BOARD MOUNTING ARRANGEMENT FOR A GOLF CART

BACKGROUND OF THE INVENTION (a) Field of the Invention

The present invention relates to the design of a scoring board for a golf cart, and more particularly to a scoring board mounting arrangement for a golf cart which can be set between a first position where the scoring board is closely attached to a mounting frame at the main rod member of the golf cart, and a second position where the scoring board is lifted from the main rod member of the golf cart and retained in a horizontal position.

(b) Description of the Prior Art

A regular golf cart is generally comprised of a main rod member, a folding collapsible wheel assembly provided at the bottom side of the main rod member for moving, bag cradles fixedly mounted on the main rod member for holding a golf bag, a handle connected to the main rod member at one end, and a scoring board mounted on the main rod member adjacent to the handle. The scoring board has clip means for securing scoring sheets of paper on the scoring board, and a hinged cover plate. Because the scoring board is fixedly secured to the main rod member of the golf cart, it is retained with the main rod member of the golf cart in a sloping position when the golf cart stands still on the ground. Therefore, the main rod member of the golf cart must be pulled down so that the scoring board can be moved with the main rod member to a horizontal position for permitting the user to write down the score on the scoring sheets of paper.

SUMMARY OF THE INVENTION

According to one aspect of the present invention, the scoring board mounting arrangement comprises a mounting frame fixedly mounted on the main rod member of a golf cart, a scoring board covered with a hinged cover plate and having a front end pivoted to a front end of the mounting frame, and a coupling member coupled between the scoring board and the mounting frame and moved between a first position where the scoring board is closely attached to the mounting frame, and a second position where the scoring board is lifted from the mounting frame and retained in a horizontal position. According to another aspect of the present invention, the coupling member has one end coupled to the mounting frame and moved along two longitudinally extended parallel sliding grooves at two opposite sides of a longitudinally extended recessed holes on the mounting frame, and an opposite end pivoted to the scoring board, and a springy retaining rod is provided at the mounting frame to hold the coupling member in the second position. The springy retaining rod has a fixed bottom end integral with the bottom side wall of the longitudinally extended recessed hole on the mounting frame at the top, a free front end suspended in the recessed hole, and two raised stop portions longitudinally spaced on the middle for holding the coupling member in the second position.

DETAILED DESCRIPTION OF THE PREFERRED EMBODIMENT

Figure 1:
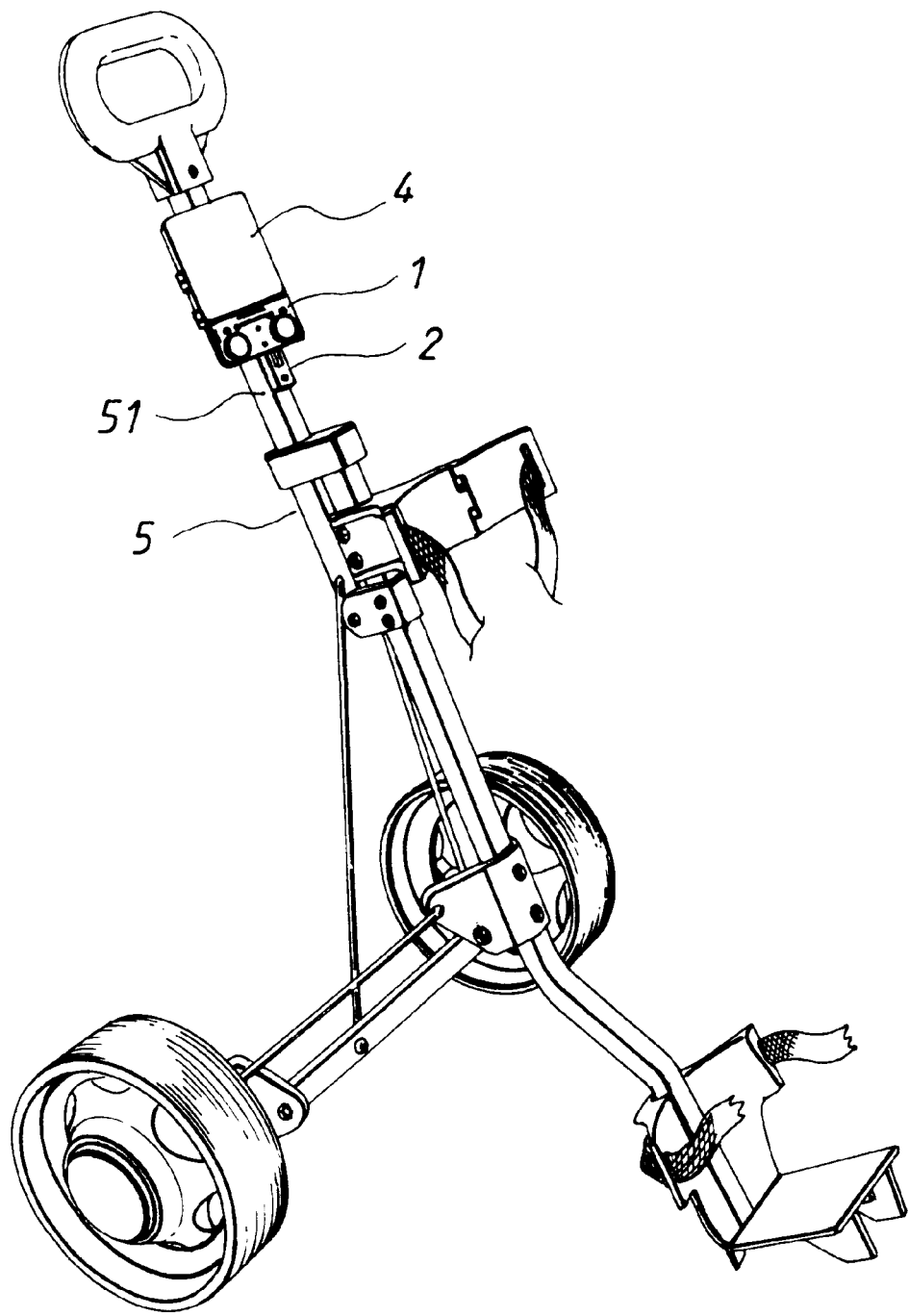
FIG. 1 is a perspective view showing the scoring board mounting arrangement installed in the main rod member of a golf cart according to the present invention.
Figure 2:
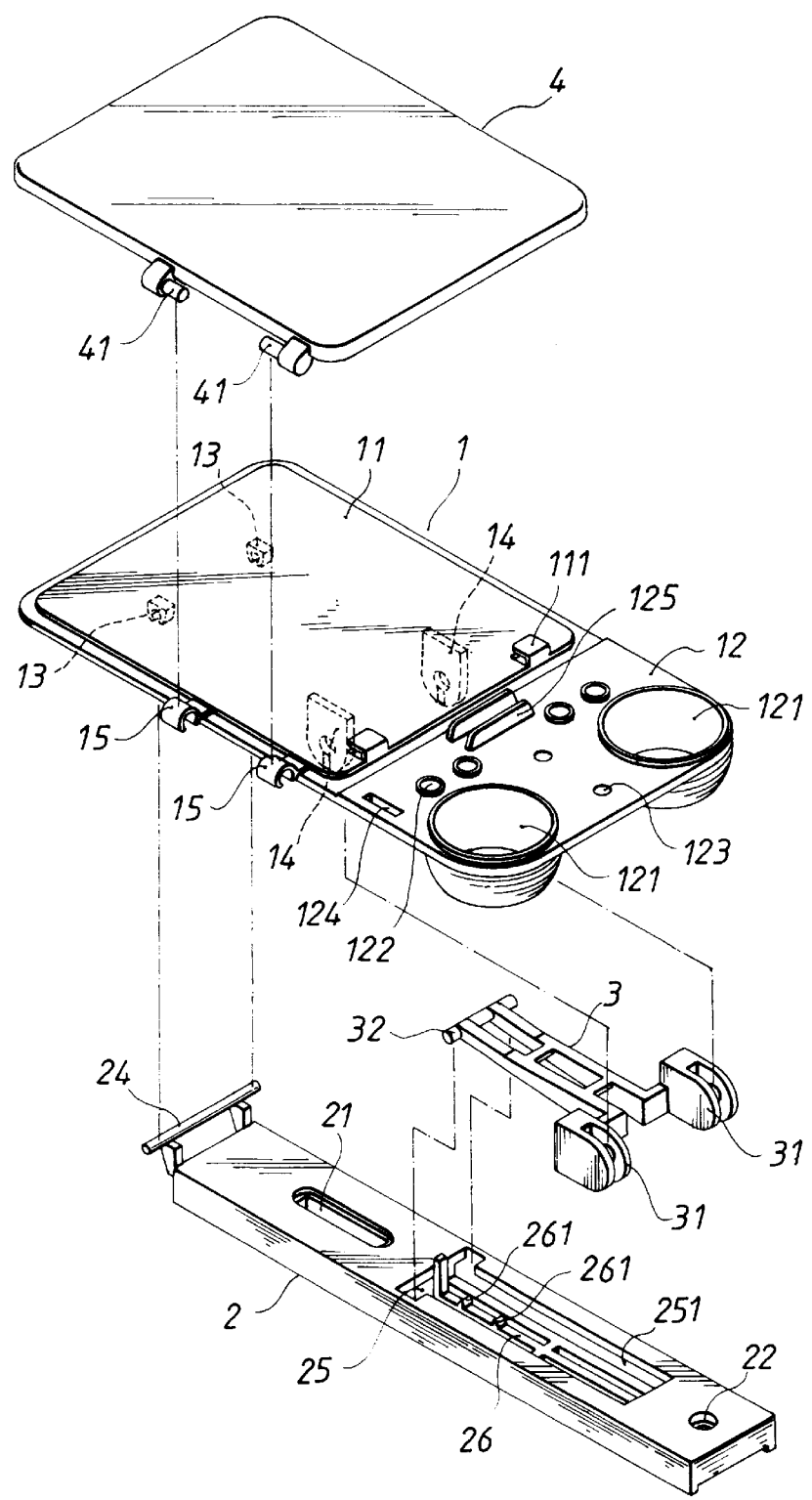
FIG. 2 is an exploded view of the scoring board mounting arrangement according to the present invention.

Referring to FIGS. 1 and 2, a scoring board mounting arrangement in accordance with the present invention is generally comprised of a scoring board 1, a mounting frame 2, and a coupling member 3. A flat cover plate 4 may be hinged to the scoring board 1.

Figure 3:
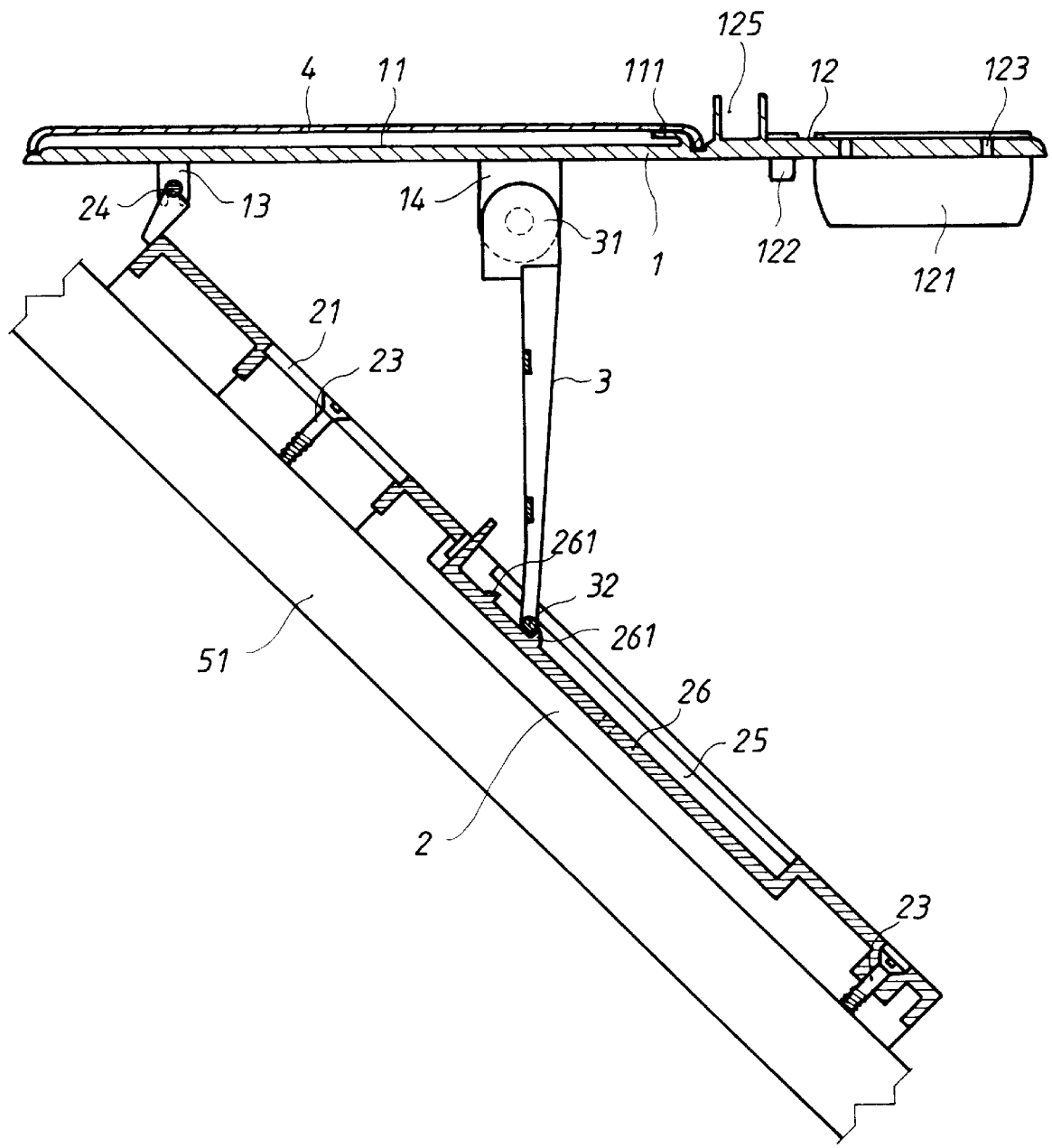
FIG. 3 is a sectional view of the present invention, showing the scoring board lifted from the mounting frame and supported on the coupling member in a horizontal position.
Figure 4:
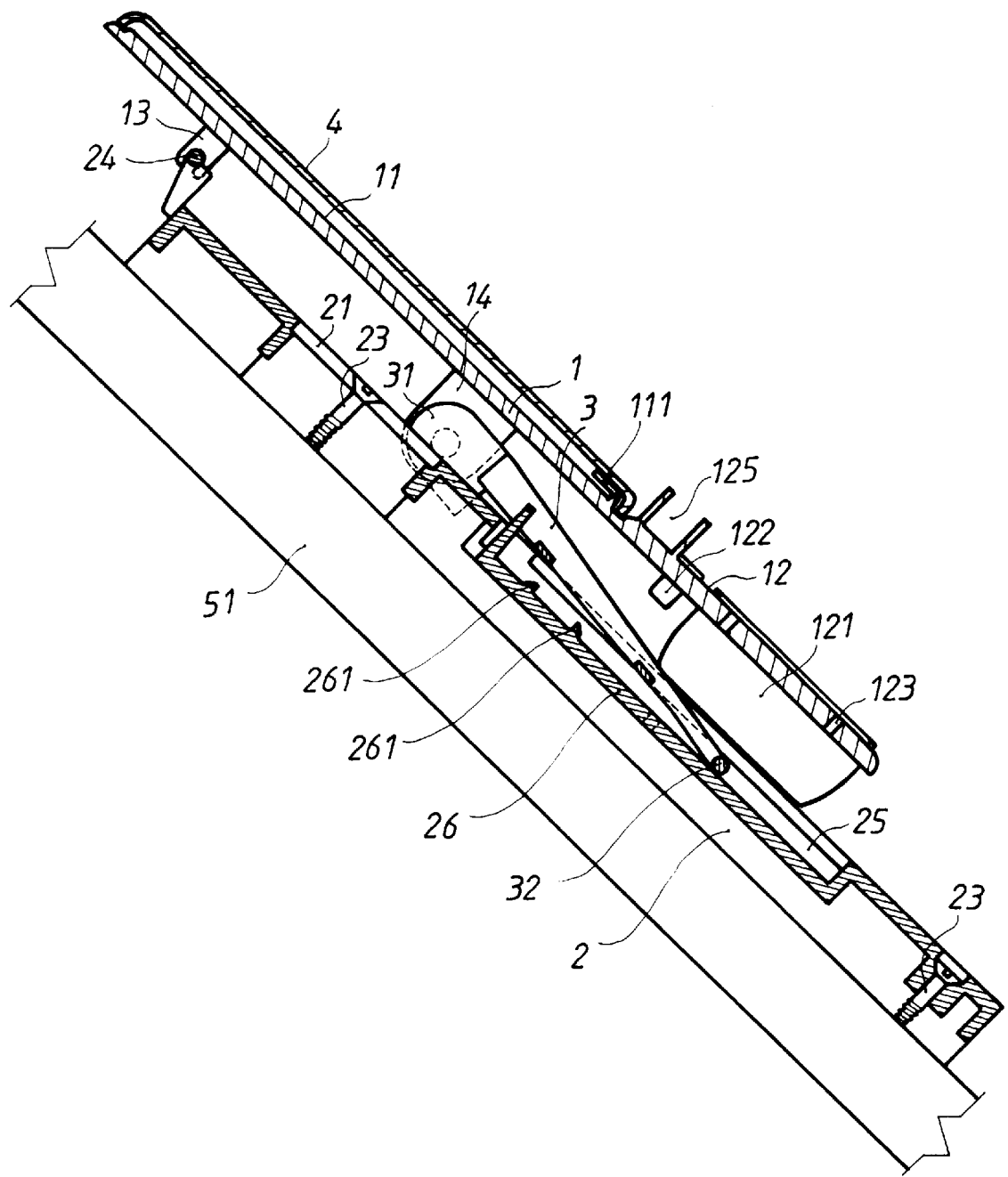
FIG. 4 is another sectional view of the present invention, showing the scoring board closely attached to the mounting frame.

Referring to FIGS. 3 and 4 and FIGS. 1 and 2 again, the scoring board 1 comprises a flat base board 11, and a platform 12 extended from one side namely the rear side of the flat base board 11. The flat base board 11 comprises two clamping plates 111 at one side for holding sheets of scoring paper on the flat base board 11, a first pair of downward lugs 13 and a second pair of downward lugs 14 raised from the bottom side wall thereof, and two knuckles 15 aligned at one lateral side thereof. The platform 12 comprises two golf ball receptacles 121 integral with the platform 12 for holding a golf ball each, a plurality of tee holding holes 122 for holding a tee each, a plurality of pin holding holes 123 for holding a pin each, a brush holding hole 124 for holding a brush, and a pen holder 125 for holding a pen. The flat cover plate 4 has two pivot pins 41 aligned at one side and respectively coupled to the knuckles 15. The mounting frame 2 comprises a plurality of mounting holes 21,22 fastened to the main rod member 51 of the golf cart 5 by fastening elements 23, a transverse pivot shaft 24 fixedly pivoted at one end thereof and pivotably coupled between the first pair of downward lugs 13 of the flat base board 11 of the scoring board 1, a longitudinally extended recessed hole 25 at the top side wall, two longitudinal sliding grooves 251 disposed at two opposite side of the recessed hole 25, and a springy retaining rod 26 longitudinally disposed in the recessed hole 25 between the longitudinal sliding grooves 251. The springy retaining rod 26 has a fixed rear integral with the mounting frame 2, a free front end suspending in the recessed hole 25, and two raised stop portions 261 longitudinally spaced on the middle between the fixed bottom end and the free front end. The mounting holes of the mounting frame 2 can be circular holes 22 or oblong holes 21. The fastening elements 23 can be screws or screw bolts. The coupling member 3 comprises a transverse pivot shaft 32 at one end pivotably coupled to the mounting frame 2, and two U-shaped coupling plates 31 respectively pivoted to the second pair of downward lugs 14 of the flat base board 11 of the scoring board 1. By pressing down the free front end of the springy retaining rod 26 and then inserting the transverse pivot shaft 32 of the coupling member 3 into the recessed hole 25, the transverse pivot shaft 32 of the coupling member 3 is coupled to the mounting frame 2, and can be moved longitudinally within the recessed hole 25 along the longitudinal sliding grooves 251 above the springy retaining rod 26. When the transverse pivot shaft 32 of the coupling member 3 is moved to the position between the two raised stop portions 261, the springy retaining rod 26 is released from the hand, permitting the transverse pivot shaft 32 to be secured in the recessed hole 25 between the stop portions 261 of the springy retaining rod 26 to support the coupling member 3 in a tilted position above the mounting frame 2, and therefore the scoring board 1 is lifted from the mounting frame 2 and retained in a horizontal position (see FIG. 3).

Figure 5:
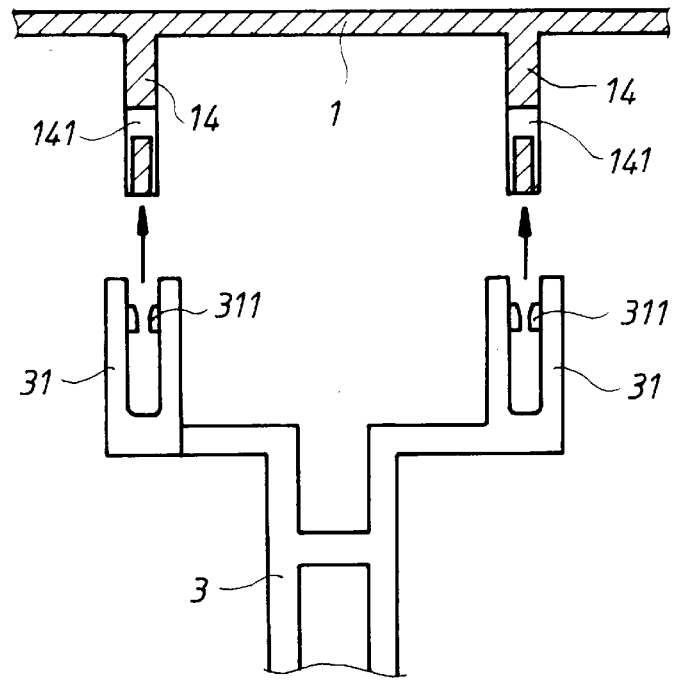
FIG. 5 illustrates the coupling arrangement between the second pair of downwardly extended lugs of the scoring board and the U-shaped coupling plates of the coupling member according to the present invention (before connection).
Figure 6:
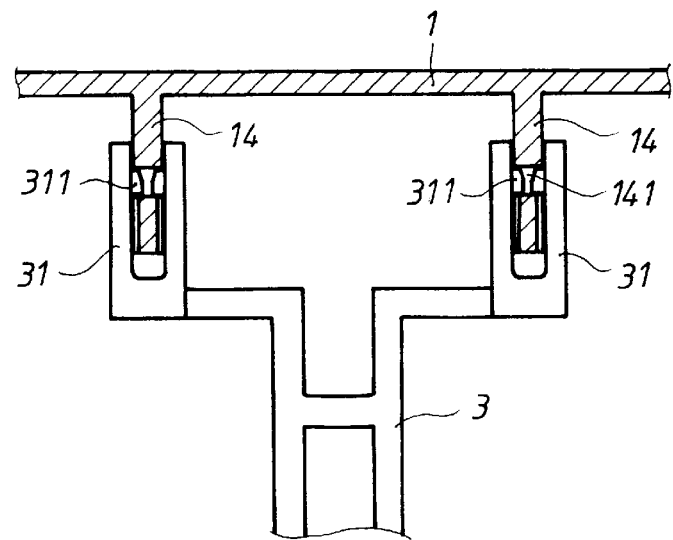
FIG. 6 illustrates the coupling arrangement between the second pair of downwardly extended lugs of the scoring board and the U-shaped coupling plates of the coupling member according to the present invention (after connection).

Referring to FIGS. 5 and 6 and FIGS. 3 and 4 again, the U-shaped coupling plates 31 of the coupling member 3 each have two raised portions 311 bilaterally disposed on the inside and facing each other. When the lugs 14 are respectively inserted into the U-shaped coupling plates 31 of the coupling member 3, the raised portions 311 of the U-shaped coupling plates 31 are respectively forced into the pivot holes 141 on the lugs 14, enabling the U-shaped coupling plates 13 to be pivoted to the lugs 14.

Referring to FIGS. 3 and 4 again, when the free front end of the springy retaining rod 26 is pressed down, the transverse pivot shaft 32 of the coupling member 32 can then be moved over the raised stop portions 261 of the springy retaining rod 26 to one end of the recessed hole 25, enabling the scoring board 1 to be moved from the horizontal position shown in FIG. 3 to the collapsed position shown in FIG. 4. When the scoring board 1 is collapsed, it is closely attached to mounting frame 2 above the main rod member 51.

As indicated above, the pivot pins 41 of the flat cover plate 4 are respectively coupled to the knuckles 15 at one side of the flat base board 11 of the scoring board 1, the flat cover plate 4 can be closed on the flat base board 11 of the scoring board 1 or lifted therefrom.

What the invention claimed is:

1. A scoring board mounting arrangement comprising:
   a mounting frame fixedly mounted on the main rod member of a golf cart, said mounting frame comprising a plurality of mounting holes fastened to the main rod member of the golf cart by a respective fastening element, a transverse pivot shaft fixedly disposed at one end, a longitudinally extended recessed hole at a top side wall thereof, two sliding grooves longitudinally disposed at two opposite lateral sides of said recessed hole, and a springy retaining rod, said springy retaining rod having a fixed rear integral with a bottom end of said recessed hole between said sliding grooves, a free front end suspending in said recessed hole, and two raised stop portions longitudinally spaced in the middle between said fixed bottom end and said free front end;
   a scoring board coupled to said mounting frame, said scoring board comprising a flat base board for holding scoring sheets of paper, and a platform extended from one side of said flat base board for holding things, said flat base board comprising a first pair of downward lugs and a second pair of downward lugs respectively raised from a bottom side wall thereof, said first pair of downward lugs being pivoted to two opposite ends of the transverse pivot shaft of said mounting frame; and
   a coupling member coupled between said scoring board and said mounting frame, said coupling member comprising a transverse pivot shaft fixedly disposed at a front end thereof and pivoted to the recessed hole on said mounting frame, and two U-shaped coupling plates bilaterally disposed at a rear end thereof and respectively pivoted to the second pair of downward lugs of said scoring board, the transverse pivot shaft of said coupling member being inserted into the recessed hole on said mounting frame and moved along said sliding grooves above said springy retaining rod between a first position where the transverse pivot shaft of said coupling member is stopped between the raised stop portions of said springy retaining rod to support said coupling member in a tilted position above said mounting frame, enabling said scoring board to be lifted from said mounting frame and retained in a horizontal position, and a second position where the transverse pivot shaft of said coupling member is moved over the raised stop portions of said springy retaining rod to a rear end of said recessed hole for permitting said scoring board to be collapsed and closely attached to said mounting frame.

2. The scoring board mounting arrangement of claim 1 wherein said scoring board further comprises a flat cover plate hinged to one side of said flat base board.

3. The scoring board mounting arrangement of claim 1 wherein said scoring board further comprises clamping means for securing scoring sheets of paper on said flat base board.

4. The scoring board mounting arrangement of claim 1 wherein said platform of said scoring board comprises a plurality of golf ball receptacles for holding a golf ball each, a plurality of tee holding holes for holding a tee each, a plurality of pin holding holes for holding a pin each, a brush holding hole for holding a brush, and a pen holder for holding a pen.

5. The scoring board mounting arrangement of claim 1 wherein the mounting holes of said mounting frame are longitudinally extended oblong holes.

* * * * *